United States Patent [19]
Tourigny

[11] Patent Number: 5,483,019
[45] Date of Patent: Jan. 9, 1996

[54] UTILITY STRUCTURE HAVING A UTILITY POLE AND A CLOSURE APPARATUS

[75] Inventor: Paul T. Tourigny, Leominster, Mass.

[73] Assignee: Angel Guard Products, Inc., Worcester, Mass.

[21] Appl. No.: 120,479

[22] Filed: Sep. 13, 1993

[51] Int. Cl.⁶ .................................. H02G 7/20
[52] U.S. Cl. ................ 174/45 R; 220/213; 362/431
[58] Field of Search .................... 174/45 R, 38, 174/66, 71 R; 362/431; 138/92; 220/251, 213, 243; 52/40, 170, 220.1, 726.4, 728; 285/121; 292/DIG. 11; D13/156, 199

[56] References Cited

U.S. PATENT DOCUMENTS 4,187,418 2/1980 Harris ........................ 174/45 R X Primary Examiner—Kristine L. Kincaid
Assistant Examiner—H. S. Sough
Attorney, Agent, or Firm—Blodgett & Blodgett

[57] ABSTRACT

A utility structure having a utility pole and a closure apparatus for the access port of the utility pole. The closure apparatus includes a removable cover which has grooves for receiving straps. The straps engage the cover along the grooves of the cover and surround the utility pole when the cover is applied to the utility port in front of the access opening of the pole. The straps are secured in a tight bands by locking clips.

2 Claims, 6 Drawing Sheets

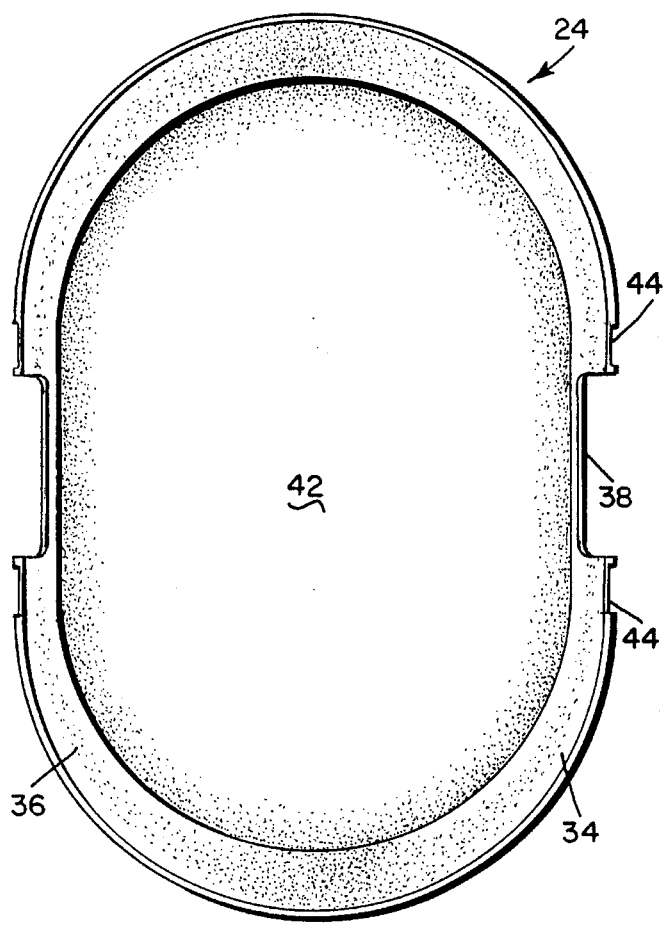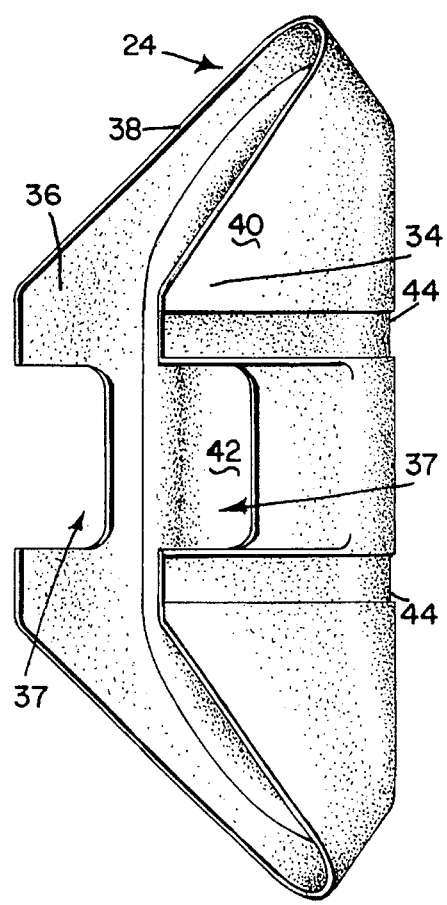
FIG. 8        FIG. 9
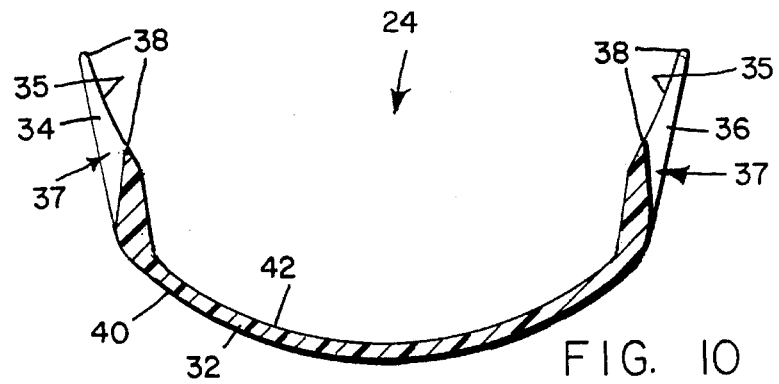
FIG. 10

5,483,019

UTILITY STRUCTURE HAVING A UTILITY POLE AND A CLOSURE APPARATUS

FIELD OF INVENTION

This invention involves an access door cover system which provides a convenient and efficient way of providing reliable efficient and removable cover of access ports in utility poles while providing a high degree of vandal resistance.

BACKGROUND OF THE INVENTION

Most modern utility poles are manufactured of hollow metal and carry electrical wiring within their interior lumen. These poles are primarily electric light poles, but also can involve other types of wiring. The proper installation and maintenance of these utility poles typically requires that an access port be provided near the ground level of the pole to provide access to electrical connections just inside of the access port. The access port is typically provided with a cover of approximately the same size as the port and screws to hold the port in place. The cover is essential to prevent unauthorized access through the port to prevent vandalism of the electrical connections within the port and also to prevent accidental injury as a result of unauthorized access.

Among the many difficulties with the conventional doorplate type of portal closure is that there is no standardization of the door sizes. As a result, there is a large number of different sizes and shapes of portals and the doors that correspond with them. Furthermore, because of the very hostile environment in which the utility poles exist, the normal screw fasteners which are used to hold the doors in place are frequently removed by vandals or lost while the authorized personnel are maintaining the poles. It is frequently necessary to replace the proper size screws with improper sizes and also to replace the lost portal closures with improperly sized closures. In addition, over a period of time, screw and bolts oxidize and become frozen to the shield and must be sheared off by authorized personnel for servicing. When this occurs, the shield is simply secured in place by tape which can be removed easily by vandals. Finally, because of all these problems and inconveniences, it is frequently the case that the portal is left open (intentionally, or accidentally) which provides an access to potentially dangerous electric current.

Thus, one serious problem which existed in prior art portal closures is the means for fastening the door over the portal. The normal system of using screws is both inconvenient, inefficient, and potentially dangerous.

The second priority concerning the prior art portal closures is that the numerous sizes of portals, and therefore closures, creates serious inefficiencies and problems.

These and other difficulties experienced with the prior art devices have been obviated in a novel manner by the present invention.

It is, therefore, a principle object of the invention to provide a utility pole cover system which provides a reliable, efficient, and vandal-resistant method of reversibly sealing the access port on a utility pole.

Another object of this invention is the provision of a utility pole portal cover system which provides a reliable and highly visible system for locking the access door over the access port.

A further object of the present invention is the provision of a utility pole access port door which is of generally universal application to all of the various sizes of access ports particularly found in utility poles.

It is another object of the present invention to provide a utility pole access port door which has a distinctive look and which, therefore, is less likely to become lost than traditional access port doors.

A still further object of the invention is the provision of a utility pole access port door which provides a long life of useful service with a minimum of maintenance.

With these and other object in view, as will be apparent to those skilled in the art, the invention resides in the combination of parts set forth in the specification and covered by the claims appended hereto.

SUMMARY OF THE INVENTION

This invention is a utility pole access port door system which provides a reliable, efficient and vandal-resistant means for closing the access port on a utility pole to prevent vandalism and accidental entry through the access port. In the simplest version of the system, the primary aspect of the invention is the replacement of standard screw-type fasteners with a lockable metal band sealing system which is commercially available and relatively easy and inexpensive to use. The bands could be used to hold a conventional access port door in place in a permanent and essentially vandal-proof manner. In a more effective version of the present invention, the traditional access port door is replaced by a cup-like structure which is especially designed to be attached to the outside of the pole and to surround and seal the access port. This cup-like structure is specifically designed with grooves on its front surface and ridges on its side edges which hold the above-mentioned metal band attachment system and protect it from common forms of vandalism which might be used to disconnect the door from its position over the access port. The access port door is also specifically designed to minimize its value as a climbing element for vandals attempting to climb the utility pole. More specifically, the surfaces are designed to provide minimal horizontal surfaces when the door is in place.

BRIEF DESCRIPTION OF THE DRAWINGS

The character of the invention, however, may be best understood by reference to one of its structural forms, as illustrated by the accompanying drawings, in which:

FIG. 8 is a rear elevational view of the cover, FIG. 9 is an elevational view of the cover looking from the left rear corner of the cover, FIG. 10 is a horizontal cross-sectional view along the line X—X of FIG. 6 and looking in the direction of the arrows.

DESCRIPTION OF THE PREFERRED EMBODIMENT

Figure 1:
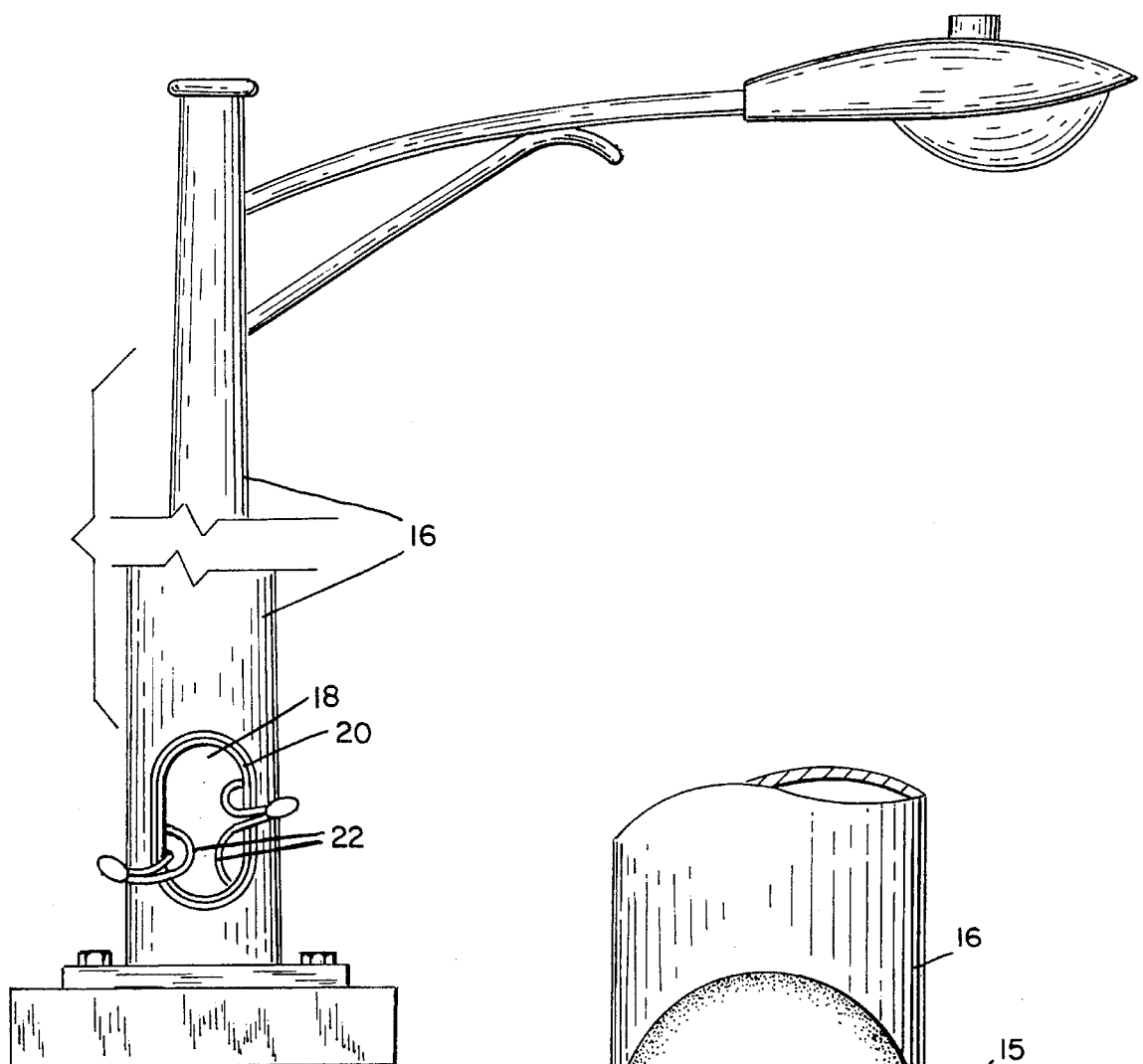
FIG. 1 is a front elevational view of a utility pole which has an access port.
Figure 2:
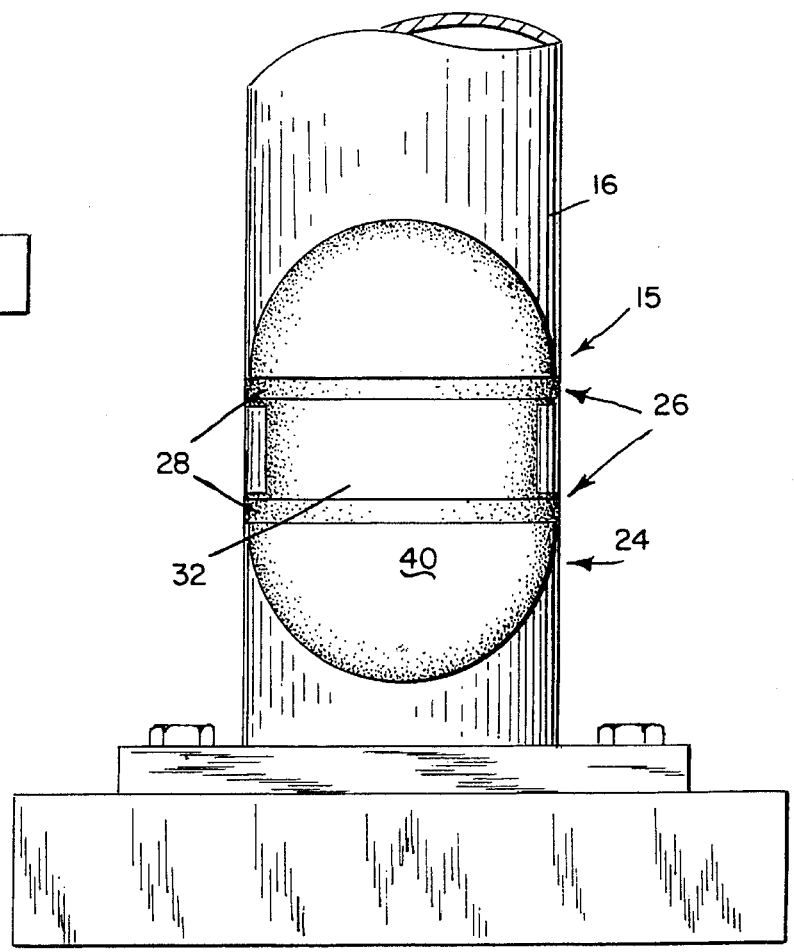
FIG. 2 is a fragmentary front elevational view of the utility pole showing the access opening closed by the closure apparatus of the present invention.
Figure 3:
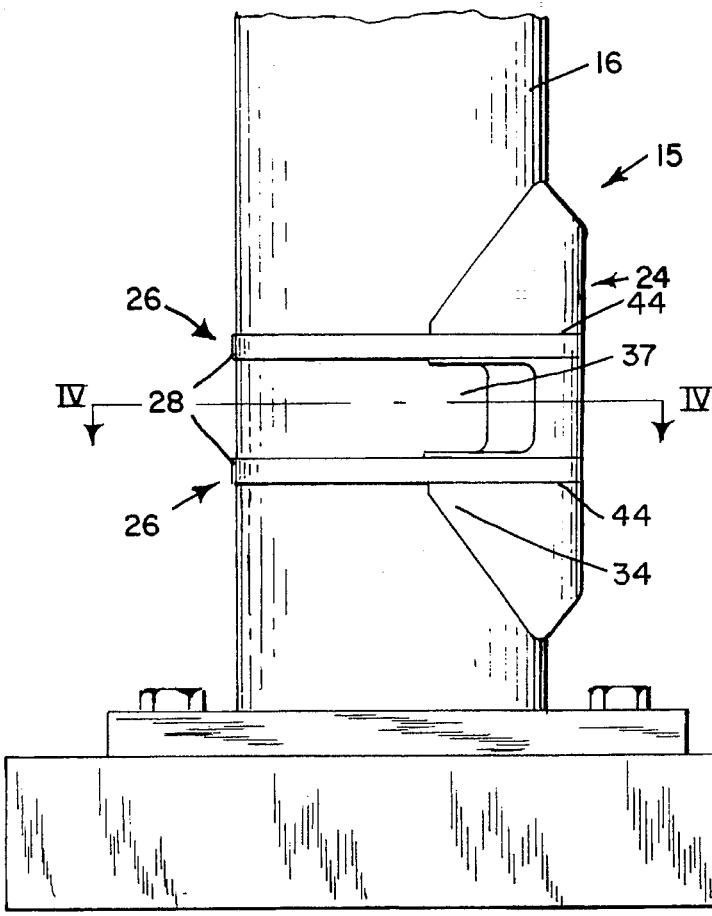
FIG. 3 is a side elevational view of the utility pole showing the access opening closed by the closure apparatus of the present invention.
Figure 4:
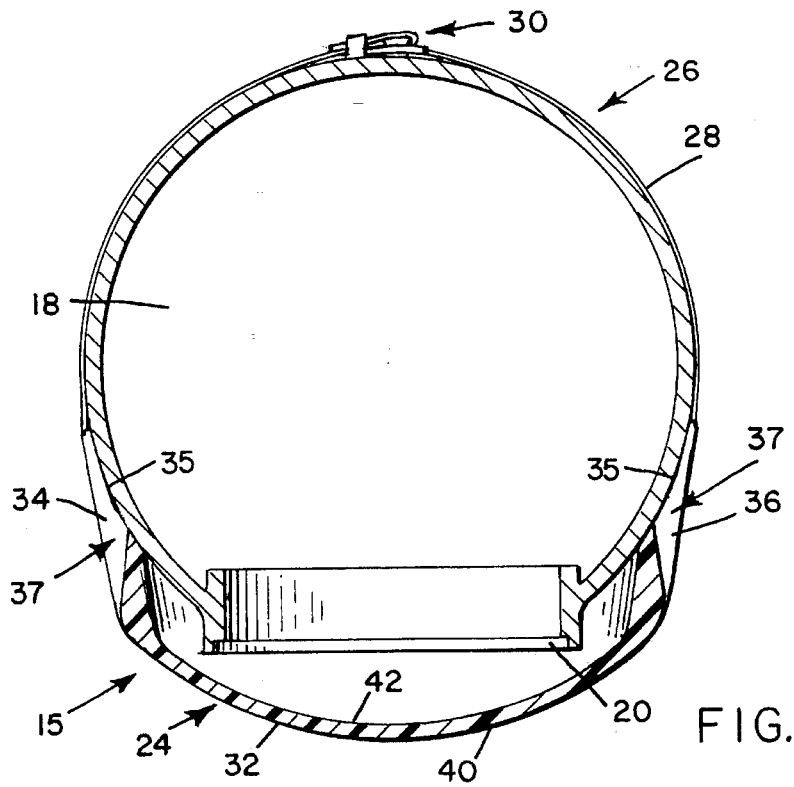
FIG. 4 is a horizontal cross-sectional view taken along the line IV—IV of FIG. 3 and looking in the direction of the arrows.
Figure 5:
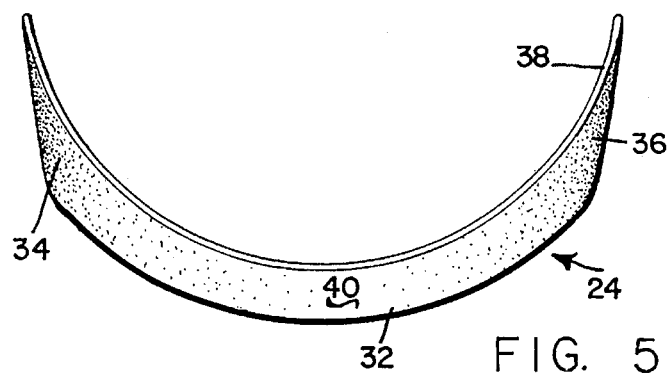
FIG. 5 is a top plan view of the removable cover portion of the closure apparatus of the present invention.
Figure 6:
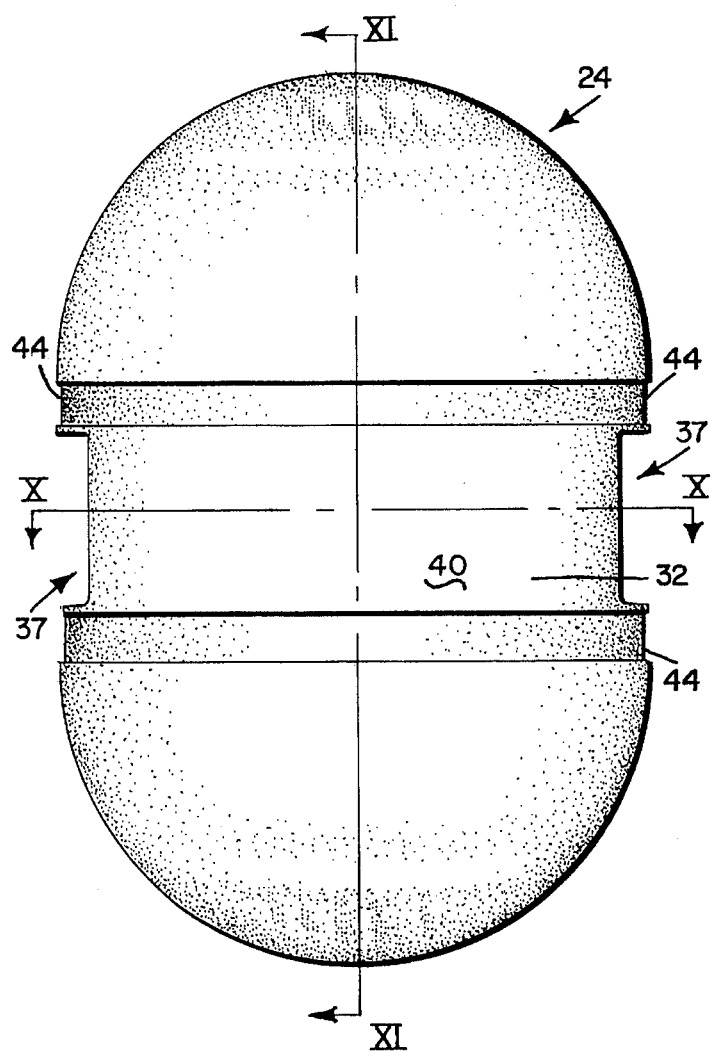
FIG. 6 is a front elevational view of the cover.
Figure 7:
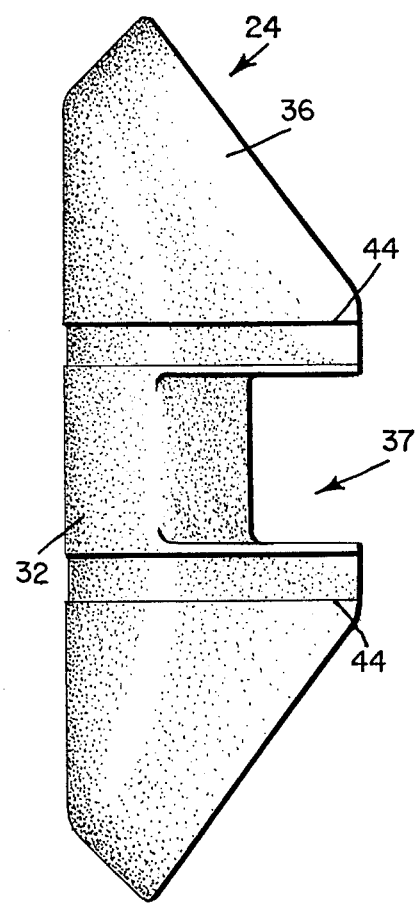
FIG. 7 is a left side elevational view of the cover.
Figure 11:
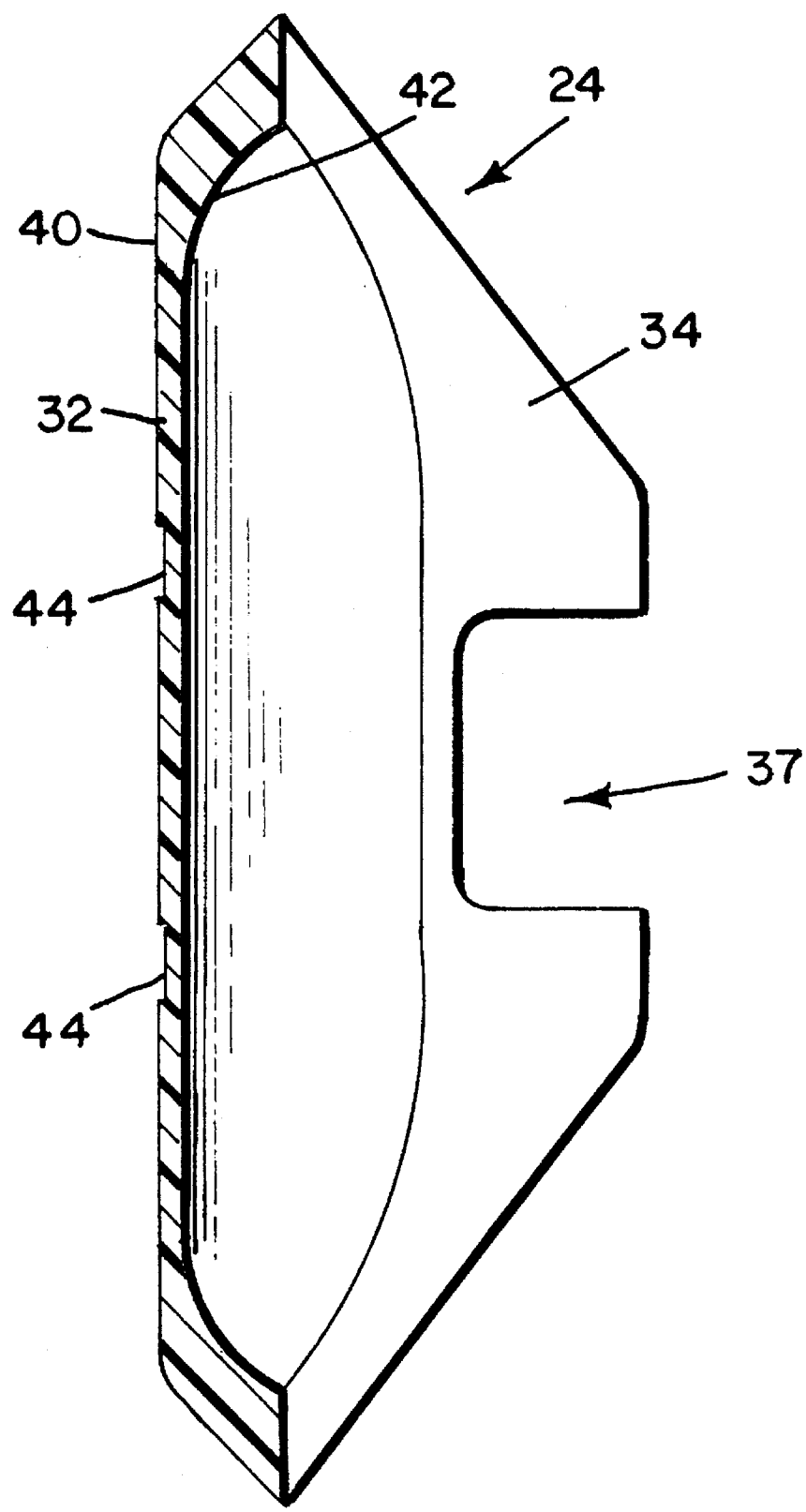
FIG. 11 is a vertical cross-sectional view along the line XI—XI of FIG. 6 and looking in the direction of the arrows.

Referring first to FIGS. 1–4, the closure apparatus of the present invention is generally indicated by the reference numeral 15 and is shown applied to a utility pole 16. The utility pole 16 has a chamber 18 which contains electrical wiring 22 and an access port 20 to the chamber 18. FIG. 2 shows the closure apparatus 15 in a closed position in front of the access opening 20. FIG. 1 shows the access opening without a closure apparatus 15 so that the wiring 22 within the chamber 18 is exposed.

The closure apparatus 15 includes a removable cover, generally indicated by the reference numeral 24, which is held tightly against the outer surface of the utility pole 16 in front of the access opening 20 by a pair of bands generally indicated by the reference numeral 26. Each band 26 consists of a length of metal strap 28 having two free ends which are secured together by a locking buckle which is generally indicated by the reference numeral 30, see also FIGS. 12 and 13 for details of the locking buckle. The cover 24 is preferably made of a tough thermoplastic material such as high molecular weight polyethylene. The cover could also be made of metal, if desired.

Referring also to FIGS. 5–11, the removable cover 24 comprises a central wall area 32 and a pair of opposite side wall areas 34 and 36 which define a rearwardly facing peripheral edge 38. Each of the side wall areas 34 and 36 has a concave inner surface 35 which fits snugly against the outer cylindrical surface of the utility pole 16 and a recess 37. The cover 24 has a generally convex front surface 40 and a generally concave rearward surface 42. The front surface 40 has a pair of spaced, generally horizontal grooves 44. The bands 26 are positioned within the grooves 44 so that the outer surface of each band is essentially flush with the outer surface 40 of the cover 24. When the cover 24 is in the closed position as shown most clearly in FIG. 4, the central wall area 32 is spaced from the access opening 20 and the side wall areas 34 and 36 are substantially tangent to the outer surface of the utility pole 16. This relationship prevents a gap from being formed between the band and the outer surface of the utility pole at the ends of the wall areas 34 and 36 at the point where the bands extend from the peripheral edge 38 and utility pole 16. The lack of a gap prevents vandals from inserting a screw driver or other prying tool between the band and the utility pole for working the band away from its clamping engagement with the cover. The fact that the bands lie within the grooves 44 also prevents the bands from being forced out of clamping engagement with the cover by applying pressure to the upper and lower edges of the bands. The overall design of the cover 24 enables the cover to engage the utility pole at points outside of the periphery of the access opening 20 so that the rear peripheral edge 38 of the cover engages the outer cylindrical surface of the utility pole in a substantially snug fit to prevent prying of the cover itself by vandals. This also enables a single cover to be used for all utility poles which vary greatly with respect to the size and shape of the access openings.

Figure 13:
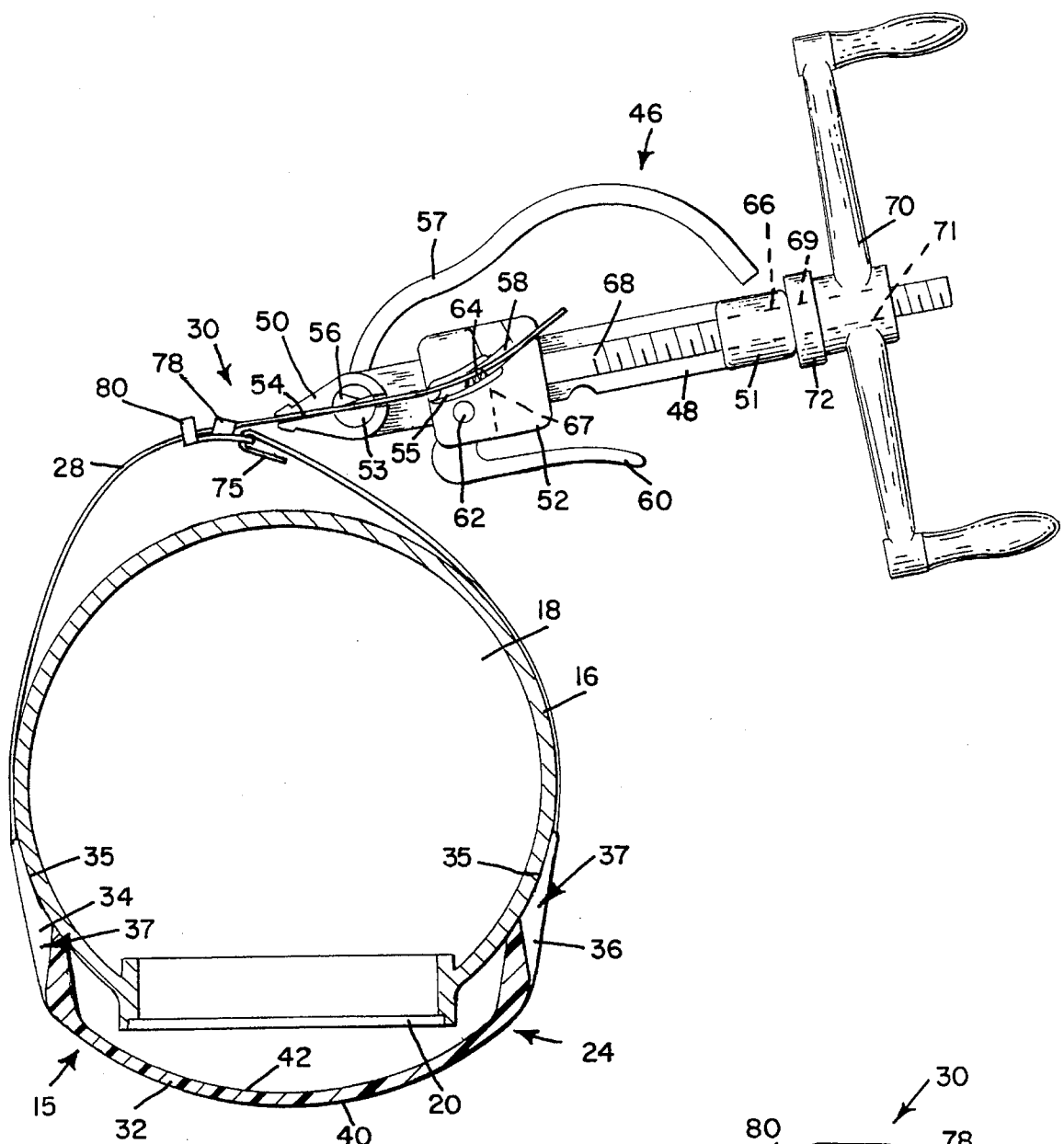
FIG. 13 is a horizontal cross-sectional view of the utility pole illustrating the technique for securing the metal strap into the locking buckle.
Figure 12:
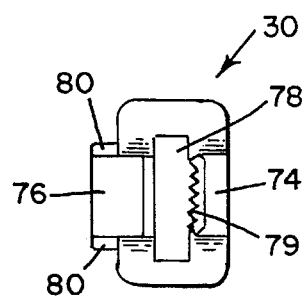
FIG. 12 is a top plan view of a locking buckle for the strap.

Referring particularly to FIGS. 12 and 13, the closure apparatus 15 of the present invention is applied to a utility pole 16 by first placing the cover 24 in front of the access opening 20 so that the side wall areas 34 and 36 engage the outer periphery of the pole 6. The cover 24 is then secured in position by the bands 26 which are formed with the use of a banding tool which is generally indicated by the reference numeral 46 and a locking buckle which is generally indicated by the reference numeral 30.

The tool 46 comprises a frame 48, a cutting head 50 which is fixed to one end of the frame and a guide bracket 51 which is fixed to the opposite end of the frame. A clamping head 52 is loosely supported on the frame 48 for sliding thereon and is fixed to one end of a threaded rod 68. The opposite end of the rod 68 extends freely through a bore 66 in the guide bracket 51 and is threaded into a threaded bore 71 and a handle 70 which is located outside of the frame 48. The rod 68 also extends freely through a bore 69 in a bearing ring 72 which is located between the handle 70 and the guide bracket 51. When the bearing ring 72 is in an abutting position between the bracket 51 and the handle 70, rotation of the handle 70 in one direction causes the threaded rod 68 to advance endwise toward the handle and, thereby draws the clamping head 52 toward the bracket 51 for a purpose to be described.

The cutting head 50 has a slot 54 which has a central enlarged portion 53. A cutter bar 56 is located within the enlarged portion 53 for rotation about a vertical axis so that its cutting edge crosses the longitudinal axis of the slot 54. A handle 57 is operatively connected to the cutter bar 56 through a horizontal slot not shown in the cutter head 50 for rotating the cutter bar about its vertical axis of rotation.

The clamping head 52 has a curved slot 58 for receiving a metal strap as illustrated in FIG. 13. A gripper handle 60 is located within a horizontal slot 67 in the head 52 and is rotatably connected to the head 52 by a pin 62 for rotation about the vertical axis of the pin. The inner end of the handle, indicated by the reference numeral 55, extends into the slot 58 and bears against a strap which is located in the slot for holding the strap in position within the slot. The end 55 is maintained in the clamping, or holding position by a spring 64. The inner end 55 of the handle is moved away from its clamping position against the bias of the spring 64 by rotating the outer end of the handle 60 in a clockwise direction as viewed in FIG. 13.

Referring particularly to FIG. 12, a locking buckle 30 comprises a pair of inner ribs 74 and 76 and an outer rib 78 which has serrations 79 along its longitudinal edge which faces the rib 74. A pair of spaced ears 80 are located near the rib 76 and extend transversely of the general plane of the buckle 30.

The bands 26 for securing the cover 24 to the utility pole are formed in the following manner: one end of a stainless steel strap 28 is bent on itself to form a loop 75 around the rib 74 of the locking buckle 30, see FIG. 13. The other free end of the strap is then inserted between the ribs 74 and 78 and the buckle is slid along the strap until the loop at the other end of the strap is looped around the rib 74. The strap is then looped around the cover and the utility pole after the cover has been positioned against the utility pole in front of the access opening 20. The straight free end of the strap is then passed between the ribs 76 and 78 of the buckle 30 and then extended to the slots 54 and 58 as illustrated in FIG. 13. The handle 70 is then rotated to draw the clamping head 52 toward the handle and to draw the strap through the buckle 30 to form a tight band around the utility pole. At this point, the outer end of the cutting head 50 will be very close to the buckle 30. At this point the tool 46 is rotated in a counterclockwise direction as viewed in FIG. 13 so that the strap is bent over the rib 78 and between the ears 80 so that it lies against itself. The handle 57 is then rotated in a counterclockwise direction as viewed in FIG. 13 for rotating the cutting bar 56 and cutting the strap. The ears 80 are then flattened to the plane of the buckle 30 so that they lie against the cut end of the strapping which has been looped back on itself.

As it becomes necessary to service the light pole, the cover can be removed by removing the straps with a cold chisel and a hammer. After servicing, the cover is rebanded as described above.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A utility structure comprising:
   (a) a utility pole having an outer cylindrical surface, an interior chamber and an access port to the chamber;
   (b) a removable cover which has a closed position when mounted on the outer cylindrical surface of said utility pole for closing said access port;
   (c) a metal strap for surrounding said utility pole and engaging said cover in said closed position;
   (d) locking means for securing said strap in a tight band against the utility pole and said cover for fixedly maintaining said cover in said closed position; and
   (e) said removable cover comprising:
      (1) a central wall portion which is adapted to lie in front of said access port when said cover is in said closed position on said utility pole;
      (2) a pair of opposite side wall portions each of said side wall portions having a concave curved inner surface which extends along a radial curve which is generated from a vertical axis, each of said side wall portions having a substantially straight outer surface which is substantially tangential to said radial curve and to the cylindrical outer surface of said utility pole, the inner and outer surfaces of each of said side wall portions extending from said central wall portion and converging toward a free end, so that when said cover is in said closed position on the utility pole, the cylindrical surface of the utility pole is closely engaged by said concave curved inner surfaces at opposite sides of the access port of the utility pole so that there is a minimum gap between the strap and said outer surface of the utility pole between the points where the strap extends from the cover to the outer cylindrical surface of said utility pole, said central and side wall portions of said cover defining a continuous outer surface which has a substantially horizontal groove for receiving said strap so that the portion of said strap which engages said cover lies entirely within said groove.

2. The utility structure as recited in claim 1, wherein there are two straps and the continuous outer surface of said cover has at least two horizontal grooves which are spaced from each other for receiving two straps.

\* \* \* \* \*